United States Patent Office 3,326,146
Patented June 20, 1967

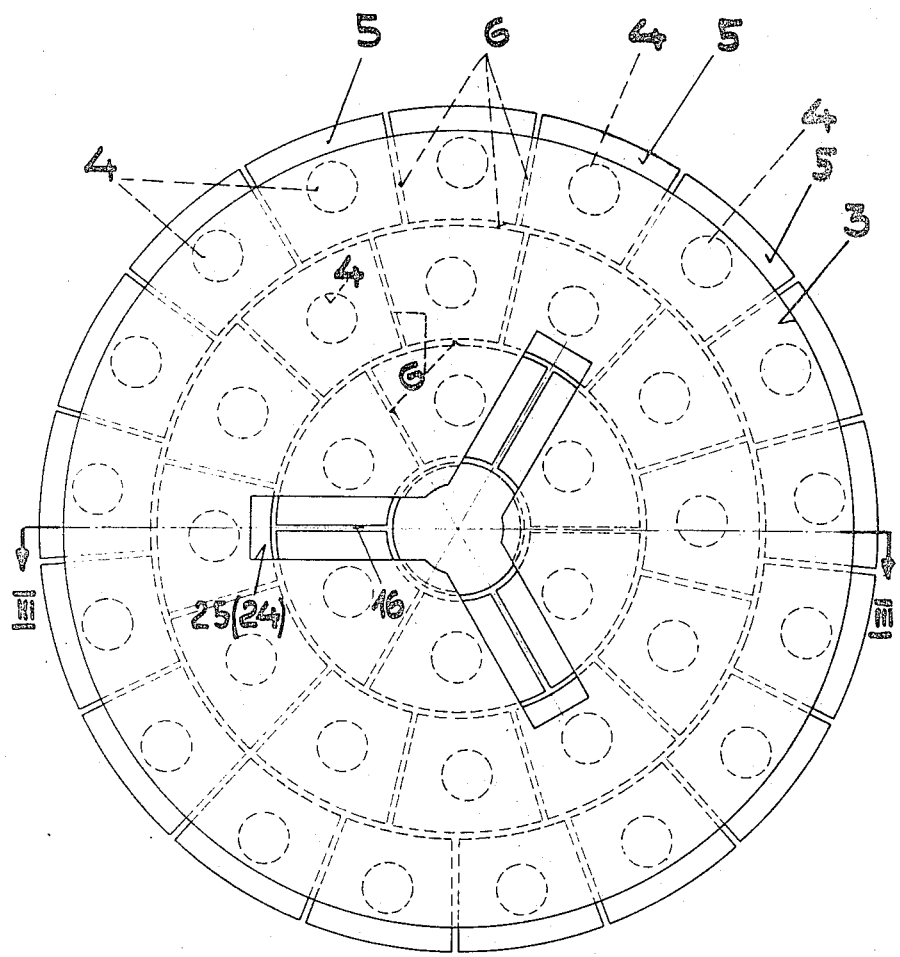

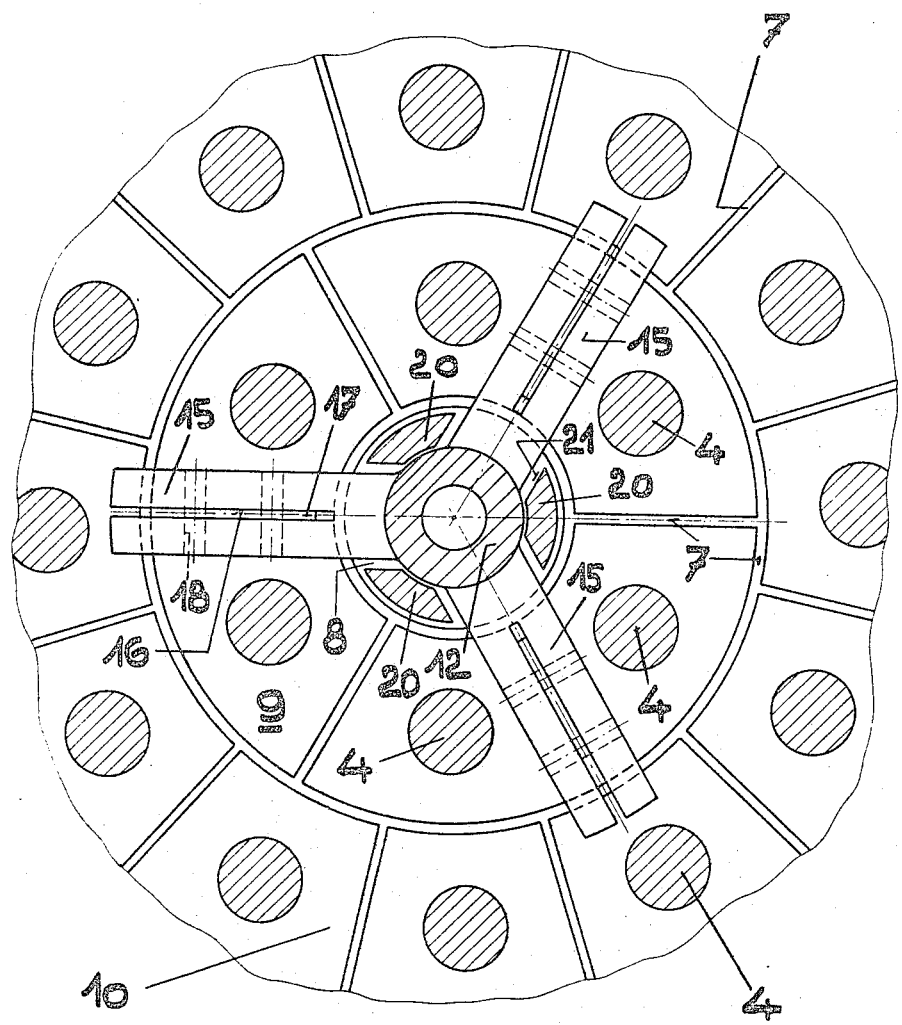

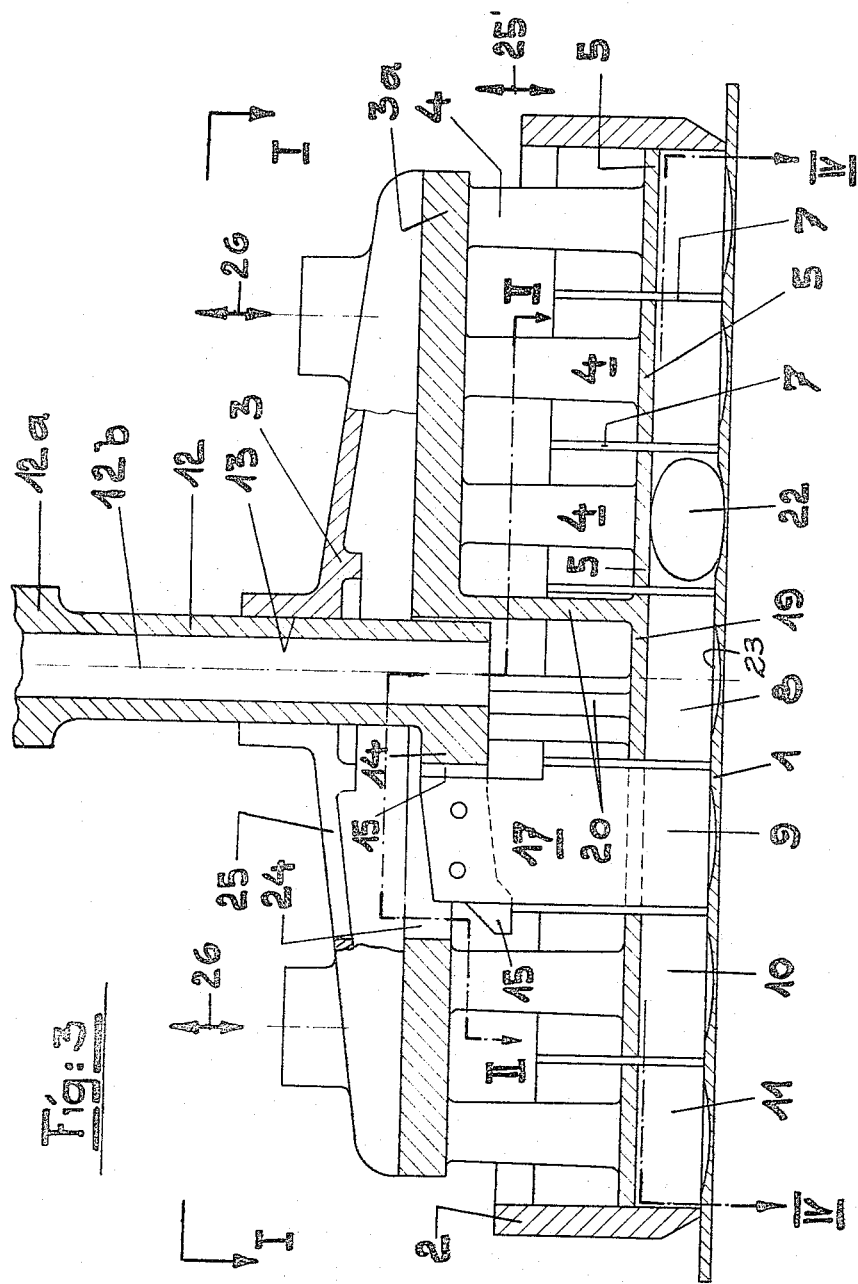

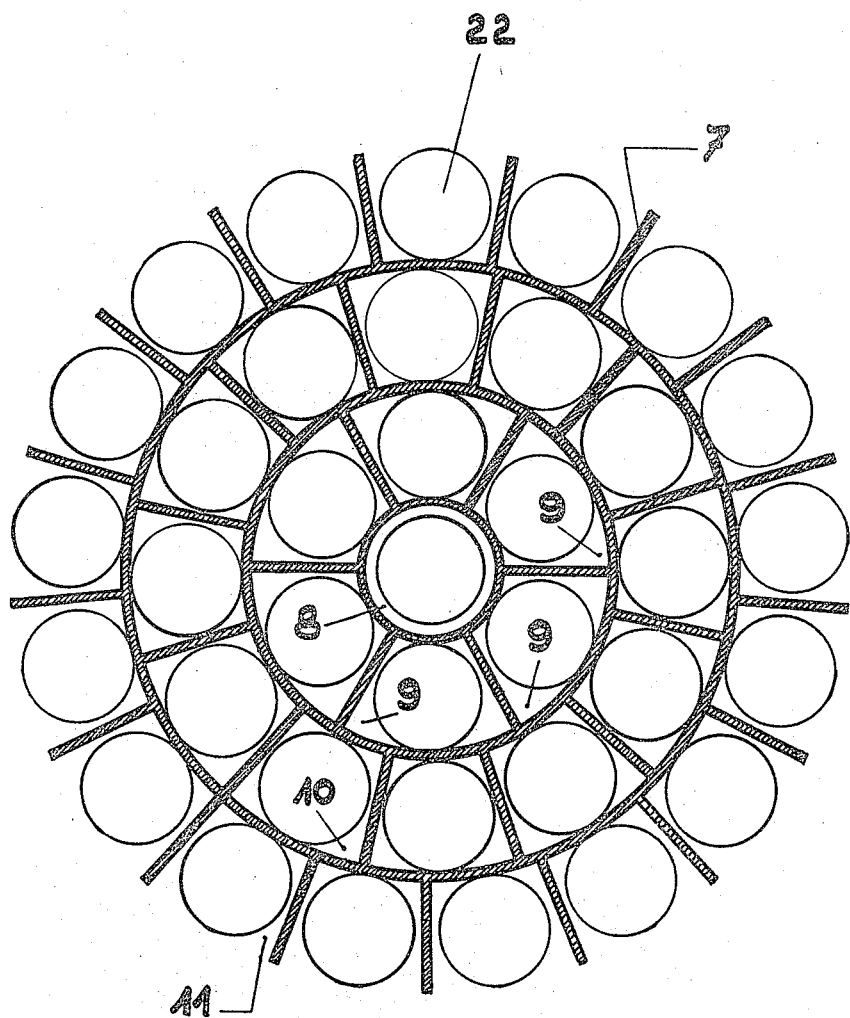
Fig: 4

3,326,146
DOUGH DIVIDING AND WORKING MACHINES
Herbert Schröder, Staffelstein, Upper Franconia,
Germany
Filed Feb. 24, 1965, Ser. No. 435,010
Claims priority, application Germany, Mar. 4, 1964,
Sch 34,748
4 Claims. (Cl. 107—68)

This invention relates to a dough dividing and working machine, as described for example in United States Patents 1,944,112 to Schroder, 2,094,289 to Blum and 2,097,042 to Rausch, more particularly to the parts of such a machine which carry out the dividing and working of the dough, namely a dough-carrying plate carrying out oscillatory movements, a dough-enclosing ring movable up and down, a press plate movable up and down relatively to the said ring inside the latter, the equal segments of which plate have between them slots for the passage of a cutter grid and are supported against a pressure head by means of thrust bolts, and finally a central cutter grid rod, the foot of which is guided through a corresponding opening in the pressure head and is connected to the latter for the purpose of moving the purpose of moving the cutter grid up and down. In known machines of this type, as shown for example in German Patents 724,159 and 1,018,813, the rod for the cutter grid pierces the pressure head and is secured to the cutter grid at its lower end. This method of construction is only possible because the cutter grid has no central compartment, no press plate segment connected to the pressure head by a thrust bolt located in the axis of the machine therefore being provided in the axis of the machine either. The object of the invention is first to design a machine of the said kind, so that a pressing and working compartment can also be arranged in the axis of the machine. The invention consists in that a central segment of the press plate is provided and is connected to the pressure head by means of thrust ribs arranged peripherally in a circle instead of by a central bolt. The foot of the pressure head is preferably designed as a four-armed cross or with three arms offset to one another through 180°; the pressure head then receives corresponding openings, through which the cross or the arms can be guided, being afterwards fixed by detachable means to the cutter grid guided through the press plate slots. This is of particular importance, if the cutter grid rod cannot be guided through the press plate, on account of driving members (bearing eyes or toothed rack) located at the lop.

The practical value of the invention resides in the fact that a plate with a central compartment can be provided. Namely such an arrangement makes it possible to provide a press plate having 36 compartments of equal area. 36 compartments are urgently required in many countries, as then 36 products, to which subsequent apparatus and machines are traditionally geared, can be made with the machine. Accordingly the invention consists also in that the cutter grid comprises 36 compartments, preferably in the following layout: a central compartment, around which six further compartments form an inner circle of compartments; around this there is a further circle of 12 compartments and around this a third outer circle of 17 compartments.

In this case the central compartment forms a hexagon or a circle circumscribing the dough product with little or no clearance and all the other compartments form quadrangles circumscribing their products with little or no clearance. In this way the compartments may be so arranged that one resembles a circle or a hexagon, while the other rectangular compartments come fairly close to a square. This is necessary because satisfactory working is possibly only if the product towards the end of the working period very lightly touches or is at a very little distance with the slightest clearance from at least two side walls of the working compartment. That is to say if the product presses against one compartment wall of the cutter grid, it is inclined to stick, so that it is taken when the cutter grid is raised. On the other hand, if it bears with pressure on the compartment wall, so that it is flattened at this point, then after raising of the cutter grid it immediately assumes (in plan) a circular form, with the result that after raising of the cutter grid two adjacent products expand and then stick together, thus becoming practically unusable.

The foot of the cutter grid rod has preferably three arms. The central segment is connected to the press plate by means of three thrust ribs, each arm projecting between two pressure ribs.

One embodiment of the invention is shown in the drawings, in which:

FIGURE 1 is a plan view of the pressure head along the line I—I of FIGURE 3, omitting the parts not belonging to the pressure head.

FIGURE 2 is a section through the pressure head and the cutter grid rod, substantially along the line II—II of FIGURE 3, on a largr scale than FIGURES 1 and 3.

FIGURE 3 is a section along the line III—III of FIGURE 1 with the addition of a few further individual parts on a scale, which is larger than that of FIGURE 1 and smaller than that of FIGURE 2.

FIGURE 4 is a section on the same scale as FIGURE 1 through the cutter grid, substantially along the line IV—IV of FIGURE 3.

The dough-carrying plate 1 shown in FIGURE 3 is connected in a known manner with a device not shown, which can impart to it a circular oscillatory movement about the machine axis 12b. Such devices provided with eccentrics are known for example through United States Patent 1,944,112, 2,094,289 and 2,097,042. On this dough-carrying plate 1 there has been placed the dough-enclosing ring 2, which is movable up and down in the direction of arrow 25' in a known manner, by means not shown. The pressure head 3 is movable up and down realtively to the dough-enclosing ring by means which act in the direction of arrows 26. The pressure head has a solid plate 3a, on which are mounted thrust bolts or plungers 4, each of which carries a segment 5. All the segments 5 together are designated the press plate. Between the segments 5 there are slots 6, through which is introduced from below a cutter grid 7, which can best be seen in FIGURE 4. This cutter grid forms altogether 36 compartments including an inner circular compartment 8. In a ring of compartments arranged round the compartment 8 there are altogether six compartments 9. To this there is added a further ring of compartments comprising twelve compartments 10 and finally an outer ring provided with seventeen compartments 11. During the pressing and working these compartments 11 are closed towards the outside by the dough-enclosing ring 2 (see FIGURE 3).

For moving the cutter grid 7 up and down there is provided a cutter grid rod 12, which is guided through a round opening 13 in the pressure head 3. It has at its upper end in the usual manner a thickening 12a, which carries either a toothed rack for the up and down movement or a bearing, on which bolts for the up and down movement of the rod act. The foot 14 of the rod carries three arms 15, each of which has a longitudinal slot 16. Extensions 17 of three cutter sections are introduced into these longitudinally slots 16 from below and are detachably fixed by means of split pins or screws, which can be pushed through the bores 18. The central compartment 8 has a segment 19, which is connected to the plate 3a of the pressure head 3 by means of three thrust ribs 20. These thrust ribs are arranged peripherally, as can be seen more particularly from FIGURE 2, so that there is room between them for the introduction of the cutter grid rod 12. Between each two thrust ribs 20 there is provided a space 21, which is large enough for one arm 15 to be accommodated without difficulty between two thrust ribs 20. In this way it is possible to form the central compartment 8. In each compartment there is room for a dough product, as indicated in FIGURE 4. In order that all the products should contain the same amount of dough, the segemnts 5 all have equal areas, so that products of equal size are formed. As shown in FIGURES 1 and 3, three openings 25 are provided in the pressure head 3 and corresponding openings 24 in the plate 3a, which enable the arms 15 to be introduced from above into the position shown.

The device works in a manner known per se, as follows:

A lump of dough is first place on the dough-carrying plate 1, its mass corresponding to the sum of 36 desired products. The dough-enclosing ring 2 is then lowered and pressed firmly on the dough carrying plate 1. Thereupon the pressure head 3 is lowered, the slots in which are closed by the retracted cutter grid, i.e. the lower edge of the cutters of grid 7 is flush with the underside of the segments 5. Thus, on lowering of the pressure head, the lump of dough resting on the dough-carrying plate 1 is pressed flat, occupying the entire space bounded by the dough enclosing ring. Thereupon the cutter grid 7 is lowered so that the flat cake of dough is divided into thirty-six pieces of equal size and weight. The dough enclosing ring and the cutter grid are then raised very slightly, so that the dough carrying plate 1 is free to move about the axis 12b. The movement is such that the middle axis of the dough carrying plate 1 rotates about the axis 12b. During the rotation of the dough carrying plate 1, the pressure head 3, 3a is pulled slowly upwards as indicated by arrows 26, so that then through the motion of the dough carrying plate 1 products 22 are formed, one of which is indicated in FIGURE 3. This figure also shows that the dough carrying plate 1 comprises in the usual way flat troughs 23, in which the products 22 are formed. The products then assume substantially the configuration and position visible in FIGURE 4. Thereupon the pressure head 3 with cutter grid 7 and dough enclosing ring 2 are raised upwards as indicated by arrow 25' so that the products 22 are freely accessible.

This whole manner of operation is known per se. Novel and inventive is merely the arrangement of the central compartment 8 and the constructional design which makes it possible to guide the cutter grid rod 12 centrally through the pressure head 3 in spite of a central compartment 8 with segment 19.

This is made possible more particularly by the thrust ribs 20, which replace the otherwise usual thrust bolts or plungers 4. As a result of this construction, the favourable division of the cutter grid into thirty-six compartments, as shown in FIGURE 4, is possible.

I claim:

1. A device for dividing and working dough comprising a dough-carrying plate carrying out oscillatory movements, a dough-enclosing ring movable up and down, a pressure head including a plurality of segments of equal area defining a press plate movable up and down relatively to the said ring inside the latter, the equal segments of which plate have between them slots for the passage of a cutter grid and are supported against the pressure head by means of thrust bolts, and finally a cutter grid rod having a foot carrying arms, the foot of which is guided through a corresponding opening in the pressure head and is connected to the cutter grid for the purpose of moving the cutter grid up and down, characterized by the feature that the press plate has a central segment, which is connected to the pressure head by means of peripherally arranged thrust ribs, and that the pressure head has above the central segment a central opening with lateral recesses, through which the cutter grid rod and arms can be introduced, said arms being detachably connectd to the cutter grid, which can be inserted from below between the segments of the press plate.

2. A machine for dividing and working dough comprising a dough-carrying plate carrying out oscillatory movements, a dough-enclosing ring movable up and down, a pressure head including a plurality of segments of equal area defining a press plate movable up and down relatively to the said ring inside the latter, the equal segments of which plate have between them slots for the passage of a cutter grid and are supported against the pressure head by means of thrust bolts, and finally a cutter grid rod having a foot carrying arms, the foot of which is guided through a corresponding opening in the pressure head and is connected to the cutter grid for the purpose of moving the cutter grid up and down, characterized by the feature that the cutter grid comprises thirty-six compartments in the following manner: a central compartment, six compartments in an inner ring of compartments, twelve compartments in a ring encircling the latter and seventeen compartments in an outer ring, the central compartment being arranged symmetrically about the machine axis and surrounding the dough product with minimum clearance, all the other compartments constituting quadrangles circumscribing their products with minimum clearance.

3. The device as claimed in claim 2, characterized by the feature that the foot of the cutter grid rod has three arms, that the central segment of the press plate is connected to the pressure head by means of three thrust ribs and that each arm is guided through between two thrust ribs.

4. The device as claimed in claim 3, characterized by the feature that each arm is detachably secured to an upwardly extended cutter section of the inner ring of compartments.

References Cited

UNITED STATES PATENTS

| | | | |
|---|---|---|---|
| 507,063 | 11/1893 | Bertram | 107—68 |
| 1,944,112 | 1/1934 | Schroder | 107—68 |

BILLY J. WILHITE, *Primary Examiner.*

WALTER A. SCHEEL, JOSEPH SHEA,
*Assistant Examiners.*